United States Patent

Truong

(10) Patent No.: US 6,237,280 B1
(45) Date of Patent: May 29, 2001

(54) PROTECTING TREES FROM VANDALISMS

(76) Inventor: Mac Truong, DeMott Ave., Teaneck, NJ (US) 07666

( * ) Notice: Subject to any disclaimer, the term of this patent is extended or adjusted under 35 U.S.C. 154(b) by 0 days.

(21) Appl. No.: 09/283,857

(22) Filed: Apr. 1, 1999

(51) Int. Cl.$^7$ ...................................................... A01G 9/14
(52) U.S. Cl. ................................................................ 47/17
(58) Field of Search .................................... 47/1.01 R, 17

(56) References Cited

U.S. PATENT DOCUMENTS

| | | | | |
|---|---|---|---|---|
| 2,069,292 | * | 2/1937 | Walker | 47/17 |
| 3,646,976 | * | 3/1972 | McColl . | |
| 4,077,158 | * | 3/1978 | England | 47/17 |
| 4,837,971 | * | 6/1989 | Visser | 47/17 |
| 5,573,558 | * | 11/1996 | Huang | 47/1.01 R |
| 5,799,488 | * | 9/1998 | Truong | 47/1.01 R |
| 5,813,168 | * | 9/1998 | Clendening | 47/17 |
| 5,833,293 | * | 11/1998 | Ludwig | 296/21 |
| 5,974,733 | * | 11/1999 | Gyory | 47/17 |

* cited by examiner

*Primary Examiner*—Robert P. Swiatek
(74) *Attorney, Agent, or Firm*—John R. Ewbank

(57) ABSTRACT

When a tree has special value, there are hazards that vandals will damage the tree, thereby running the risk of killing it. Cemeteries have long been poular with vandals, resulting in damage to many tombstones. The Memorial Grove described in Truong U.S. Pat. No. 5,799,488 resembles a cemetery in that there are long periods when the visitor density is low, thus increasing the probability of vandalism. An installation is provided in which a plurality of potted trees are normally maintained at a level lower than the spectator's level, there being a system so that a potted tree can be placed on a platform and lifted to a level making it suitable for the spectator to see but not touch. Such an installation can be predominantly outdoors, or can utilize a building permitting the potted tree to be exposed to the weather much of the time, while having a shiftable skylight usually maintained in its parked position but shiftable to cover the opening in the roof to thus protect the tree during adverse weather.

2 Claims, 1 Drawing Sheet

PROTECTING TREES FROM VANDALISMS

BACKGROUND

1. Field of Invention

Figure 1:
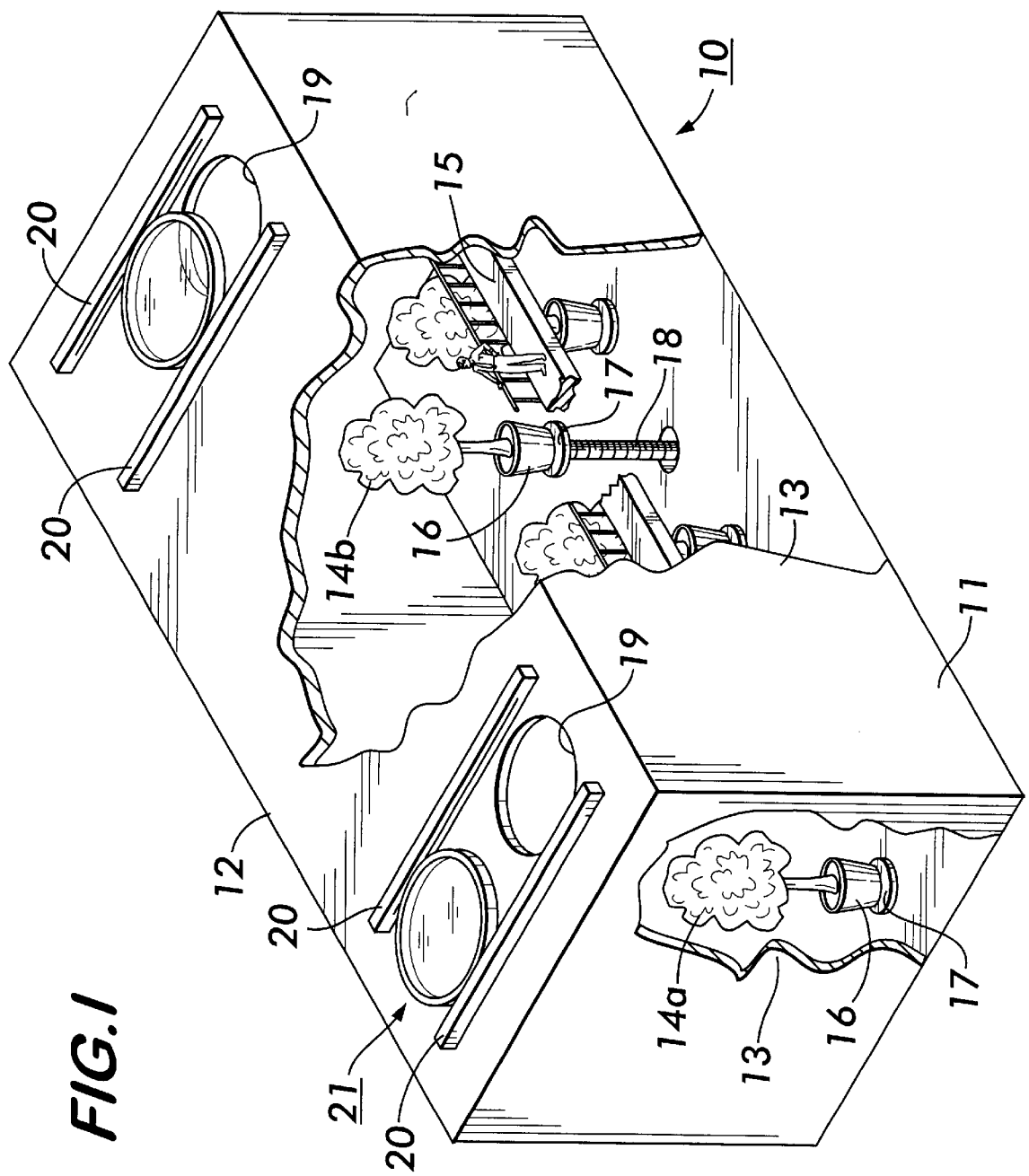

The property which is particularly valued by certain people tends to be vandalized by some enemies of such property-cherishers. There has been a long-standing demand for installations suitable for exhibiting valuable trees while protecting them from vandalism.

2. Prior art

Truong U.S. Pat. No. 5,799,488 describes a Memorial Grove in which in which substantially each tree has been grown in a nutrient containing the remains of a particular individual.

Chen U.S. Pat. No. 4,780,994 describes a "skyscraper cemetery" in which the microorganisms in the soil can compost a casket and body in a vault several stories above the street level.

SUMMARY OF INVENTION

In accordance with the present invention, potted trees are displayed in an installation featuring a difference in the elevation of the spectator and the normal maintenance level for the potted trees. For example, the potted trees can normally be maintained in a longitudinal pit, with the pathway for the spectator at a higher level. A building can be provided for the exhibition of potted trees, comprising a maintenance level at which potted trees are normally maintained, and a lifting mechanism can be provided so that a potted tree can be raised to the spectator's level, the spectator's pathway being sufficiently spaced from the tree that the tree is beyond the reach of the spectator. Trees are generally healthier when exposed to normal weather fluctuations, but are sometimes endangered by adverse weather. Optimally, the trees are protected from adverse weather by being protected by a building having a skylight, the skylight normally being maintained in a parked position, but readily slideable into a protective position over the opening in the roof.

DRAWING

In the accompanying drawing, FIG. 1 is a schematic view of one embodiment of the invention.

DESCRIPTION OF A PREFERRED EMBODIMENT

As shown in FIG. 1, a building 10 having a flat roof 12 is supported by walls 13. Such building 10 can be adapted to protect potted trees 14a, 14b, etc. scheduled for intermittent display to spectators. A walkway 15 is positioned along at least one wall and is spaced from the ceiling by more than 6 feet. Such walkway accommodates spectators desiring to see the displayed valuable trees, while still protecting the trees from being touched by spectators because the trees are positioned beyond the reach of such spectators.

Each tree 14a, 14b is growing in a pot 16 resting upon a platform 17. Particular attention is directed to a lifting mechanism 18 adapted to shift the platform 17 and tree 14a, 14b from the lower maintenance level to the viewing level for the spectators on the walkway 15. Maintenance crews can fertilize, water, and otherwise care for the potted trees at the maintenance level. Spectators can have a closer view of the tree when it is elevated.

It is sometimes desirable to have the installation for the display of the trees in a building instead of in an outdoor grove.. Such building desirably has a skylight which is shiftable so that the skylight can normally be maintained in its parked position retracted from the opening in the roof, whereby the trees can experience some of the fluctuations of the weather. To protect the trees from adverse weather conditions, the skylight can be shifted to its protective position covering its opening in the roof.

Various modifications of the invention are possible without departing from the scope of the appended claims.

The invention claimed is:

1. An installation for exhibiting trees comprising:

a pathway for spectators, said pathway being at an elevated level;

a maintenance zone for maintenance personnel and for the storage of trees not currently being exhibited, said zone being at a level lower than said pathway for spectators;

a plurality of potted trees;

a plurality of lifting mechanisms, with one lifting mechanism employed with each potted tree and adapted to lift said tree from said maintenance level to an exhibiting zone, said exhibiting zone positioning each tree so that spectators have a better view of a potted tree while positioning such potted tree beyond the reach of a spectator.

2. The installation of claim 1 which comprises:

a building having a roof, at least one opening in said roof for a skylight;

a skylight for said at least one opening;

shifting means for said skylight, said shifting means permitting the building and the potted trees therein to encounter fluctuations of weather when the skylight is shifted to its parked position away from said at least one opening, but protecting the potted trees from adverse weather when said skylight is shifted to its protective position over said at least one opening.

* * * * *